United States Patent
Ishigaki

(10) Patent No.: US 9,893,631 B2
(45) Date of Patent: Feb. 13, 2018

(54) NON-ISOLATED DC-DC CONVERSION CIRCUIT CONFIGURED FOR CAPACITIVE AND MAGNETIC POWER TRANSFER

(71) Applicant: TOYOTA MOTOR ENGINEERING & MANUFACTURING NORTH AMERICA, INC., Erlanger, KY (US)

(72) Inventor: Masanori Ishigaki, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 22 days.

(21) Appl. No.: 14/862,860

(22) Filed: Sep. 23, 2015

(65) Prior Publication Data

US 2017/0085187 A1   Mar. 23, 2017

(51) Int. Cl.
H02M 3/335 (2006.01)
H02M 3/00 (2006.01)
H02M 1/00 (2006.01)

(52) U.S. Cl.
CPC ... *H02M 3/33546* (2013.01); *H02M 3/33584* (2013.01); *H02M 3/005* (2013.01); *H02M 2001/0058* (2013.01); *Y02B 70/1491* (2013.01)

(58) Field of Classification Search
CPC ............. H02M 3/335; H02M 3/33523; H02M 3/33592; H02M 1/08; H02M 3/33546; H02M 3/33584; H02M 3/33507; H02M 2001/009; H02M 2007/4815; H02M 2007/4826
See application file for complete search history.

(56) References Cited

U.S. PATENT DOCUMENTS

| | | | |
|---|---|---|---|
| 6,490,181 B1 | 12/2002 | Liu et al. | |
| 7,701,182 B2 | 4/2010 | Yoshida | |
| 7,876,581 B2 | 1/2011 | Kim et al. | |
| 8,670,250 B2 | 3/2014 | Fu et al. | |
| 2003/0227280 A1* | 12/2003 | Vinciarelli | H02M 1/088 323/265 |
| 2004/0145439 A1* | 7/2004 | Grilo | H01F 19/08 336/145 |
| 2009/0001955 A1* | 1/2009 | Yoshida | H02M 3/158 323/282 |
| 2009/0128121 A1* | 5/2009 | Granat | H02M 3/1582 323/355 |
| 2009/0243399 A1* | 10/2009 | Williams | G01V 3/26 307/113 |

(Continued)

*Primary Examiner* — Gustavo Rosario Benitez

(74) *Attorney, Agent, or Firm* — Oblon, McClelland, Maier & Neustadt, L.L.P.

(57) ABSTRACT

A power transfer system includes DC-DC power conversion circuitry that has a first switch and a second switch on either side of a transformer connected via a common ground with a first capacitor and a second capacitor cross-connected across the transformer. A direction of power transfer is determined, and primary and secondary sides of the DC-DC power conversion circuitry are aligned based on the direction of power transfer. An amount of on-time for the first switch or the second switch is determined based on a quantity of power transfer through the DC-DC power conversion circuitry. The primary and secondary switches are controlled using switching.

20 Claims, 10 Drawing Sheets

(56) References Cited

U.S. PATENT DOCUMENTS

| | | | |
|---|---|---|---|
| 2010/0202160 A1* | 8/2010 | Kim | H01F 27/38 363/16 |
| 2013/0214607 A1 | 8/2013 | Harrison | |
| 2013/0300210 A1* | 11/2013 | Hosotani | H02J 5/005 307/104 |
| 2014/0268899 A1* | 9/2014 | Hosotani | H02M 3/33569 363/17 |
| 2016/0031330 A1* | 2/2016 | Ishigaki | B60L 11/182 307/10.1 |

* cited by examiner

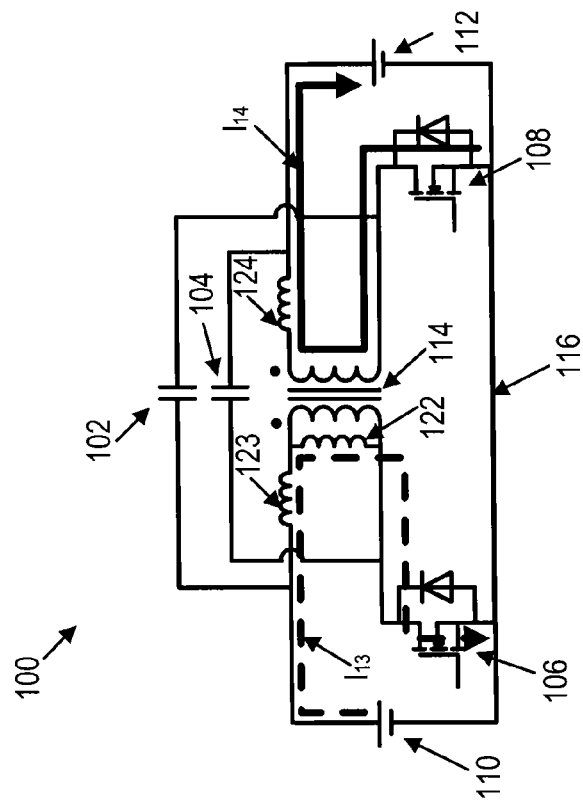
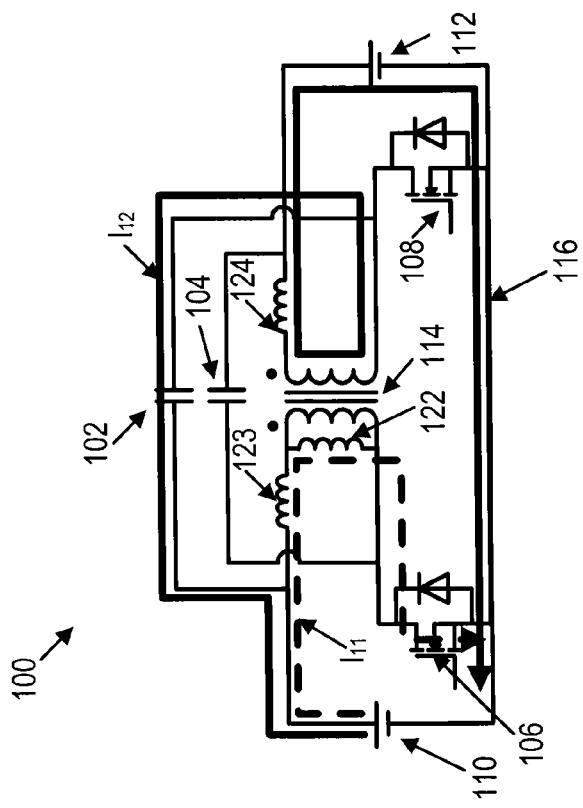
Fig. 3A
Fig. 3B

NON-ISOLATED DC-DC CONVERSION CIRCUIT CONFIGURED FOR CAPACITIVE AND MAGNETIC POWER TRANSFER

CROSS-REFERENCE TO RELATED PATENT APPLICATIONS

The present application incorporates by reference the entire contents of U.S. patent application Ser. No. 14/504,125 having common inventorship with the present application and filed in the U.S. Patent and Trademark Office on Oct. 1, 2014 and U.S. patent application Ser. No. 14/815,754 having common inventorship with the present application and filed in the U.S. Patent and Trademark Office on Jul. 31, 2015.

BACKGROUND

A non-isolated DC-DC converter can perform non-inverse, bi-directional power transfer. U.S. Pat. No. 7,701,182 B2 entitled "DC-DC Converter" by Yoshida describes a low-noise, non-isolated DC-DC converter for providing a non-inverted output voltage at any desired voltage.

SUMMARY

In an exemplary implementation, a system can include: DC-DC power conversion circuitry including a first switch and a second switch on either side of a transformer connected via a common ground with a first capacitor and a second capacitor cross-connected across the transformer. The control circuitry can: determine a direction of power transfer through the DC-DC power conversion circuitry, align a primary side and a secondary side of the DC-DC power conversion circuitry based on a determined direction of power transfer, determine an amount of on-time for the first switch or the second switch based on a quantity of power transfer through the DC-DC power conversion circuitry, and control switching of the first switch and the second switch.

The DC-DC power conversion circuitry can perform non-inverse, bi-directional power transfer. The system can determine the direction of power transfer by selecting the first switch or the second switch to cycle on and off.

The system can increase the amount of on-time for the first switch or the second switch to increase the quantity of power transferred through the DC-DC power conversion circuitry.

The system can maintain a constant off-time for the first switch or the second switch to implement soft-switching, and the off-time for the first switch or the second switch corresponds to one half of a resonance period. The off-time for the first switch or second switch can based on implementing zero voltage switching and zero current switching at turn-on and zero voltage switching at turn-off.

The DC-DC power conversion circuitry can recover a predetermined amount of power from the secondary side to the primary side during the off-time of the first switch or the second switch. The DC-DC power conversion can recover the predetermined amount of power via one or more leakage inductors, the first capacitor, and the second capacitor.

The capacitance values of the first capacitor and the second capacitor of the first capacitor and the second capacitor can be equal.

The DC-DC power conversion circuitry can have a constant resonant frequency based on inductances of one or more leakage inductors and a capacitance of the first capacitor or the second capacitor.

The DC-DC power conversion circuitry can transfer power from the primary side to the secondary side via the first leakage inductor, second leakage inductor, and the first capacitor during a first resonance period. The first resonance period corresponds to one quarter resonance period commencing when the primary switch or the secondary switch is turned on.

A turn count of the transformer of the DC-DC power conversion circuitry can be based on reducing a flux density within the transformer due to a voltage difference between the first side and the second side of the DC-DC power conversion circuitry. The system can control the voltage difference between the primary side and the secondary side of the DC-DC power conversion circuitry based on the flux density within the transformer.

The system can detect component failure within the DC-DC power conversion circuitry based on sensor data from one or more sensor devices installed within the DC-DC power conversion circuitry.

The DC-DC power conversion circuitry can include integrated cell balancing circuitry including a primary side of a second transformer connected between a first pair and a second pair of cross-connected capacitors of the DC-DC power conversion circuitry.

A total amount of power transferred between the primary side and the secondary side of the DC-DC power conversion circuitry can be based on an amount of time corresponding to inductive power transfer across the transformer.

In another exemplary implementation, a process can include: determining a direction of power transfer through the DC-DC power conversion circuitry including a first switch and a second switch on either side of a transformer connected via a common ground with a first capacitor and a second capacitor cross-connected across the transformer; aligning a primary side and a secondary side of the DC-DC power conversion circuitry based on the determined direction of power transfer; determining an amount of on-time for the first switch or the second switch based on a quantity of power transfer through the DC-DC power conversion circuitry; and controlling switching of the first switch and the second switch.

A further exemplary implementation can include control circuitry that can determine a direction of power transfer through the DC-DC power conversion circuitry including a first switch and a second switch on either side of a transformer connected via a common ground with a first capacitor and a second capacitor cross-connected across the transformer; align a primary side and a secondary side of the DC-DC power conversion circuitry based on the determined direction of power transfer; determine an amount of on-time for the first switch or the second switch based on a quantity of power transfer through the DC-DC power conversion circuitry; and control switching of the first switch and the second switch.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A illustrates an exemplary current flow path in a non-isolated DC-DC power conversion circuit;

FIG. 3B illustrates an exemplary current flow path in a non-isolated DC-DC power conversion circuit;

DETAILED DESCRIPTION

Figure 1:
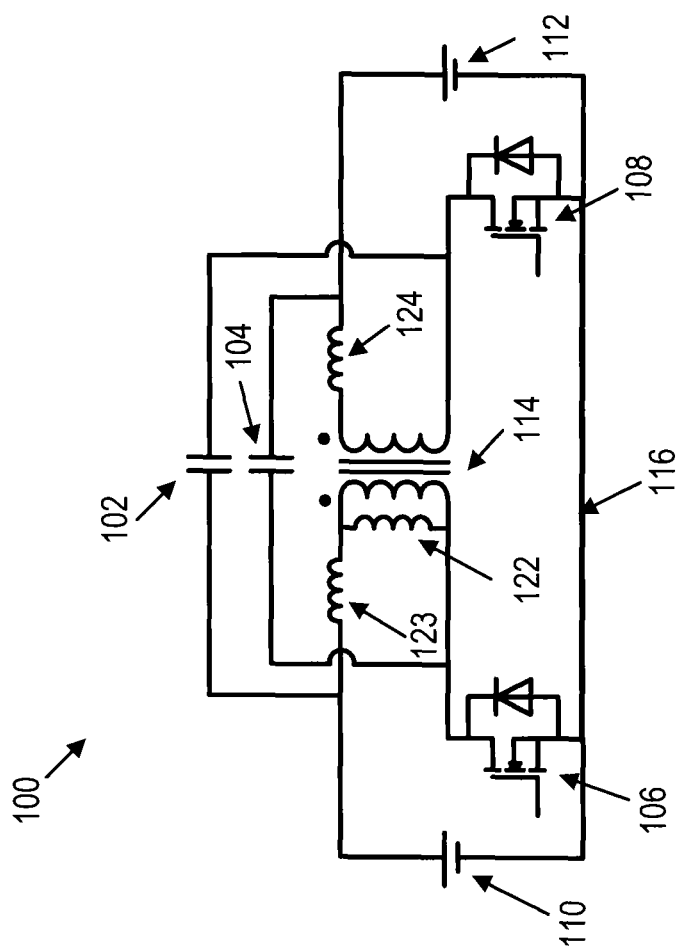
FIG. 1 is an exemplary illustration of a non-isolated DC-DC power conversion circuit.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1 is an exemplary illustration of a non-isolated DC-DC power conversion circuit 100. The non-isolated DC-DC power conversion circuit 100 can include a primary side and a secondary side that are symmetrical on either side of a magnetic core transformer 114. In an exemplary implementation, capacitors 102 and 104 can be cross-connected across the magnetic core transformer 114. The primary side can include a primary switch 106 and a primary DC power supply 110, and the secondary side can include a secondary switch 108 and a secondary DC power supply 112. In an implementation, the capacitance values of the cross-connected capacitors 102 and 104 can be equal. The primary switch 106 and the secondary switch 108 can include a MOSFET with a diode connected from the source to the drain of the MOSFET. In some aspects, the turn ratio N of the magnetic core transformer 114 is determined based on the ratio of the voltage of the primary DC power supply 110 to the voltage of the secondary DC power supply 112. In addition, the primary side and secondary side of the non-isolated DC-DC power conversion circuit 100 share a common ground 116.

The non-isolated DC-DC power conversion circuit 100 can also include an exciting inductor 122 and leakage inductors 123 and 124. In some aspects, the leakage inductor 123 is on the primary side and the leakage inductor 124 is on the secondary side of the non-isolated DC-DC power conversion circuit 100. In some implementations, the magnetic core transformer 114 can be an ideal transformer, and the exciting inductor 122 and/or the leakage inductors 123 and 124 can illustrate an equivalent circuit for a real transformer. The exciting inductor 122 can be added in parallel with the primary side of the magnetic core transformer 114 in order to account for non-zero reluctance within the magnetic core transformer. In addition, the leakage inductors 123 and 124 can demonstrate how imperfect coupling within the magnetic core transformer 114 can affect the functionality of the isolate DC-DC power conversion circuit 120.

In certain implementations, the non-isolated DC-DC power conversion circuit 100 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during battery cell balancing.

In order to allow the electrical components to operate as either power sources or electrical loads, the non-isolated DC-DC power conversion circuit 100 can operate bi-directionally due to the symmetry between the primary and secondary sides. More specifically, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In some implementations, the primary switch 106 and secondary switch 108 are controlled by gate drivers that are integrated into the primary switch 106 and the secondary switch 108. Details regarding bi-directional power transfer are discussed further herein.

In addition, power transfer through the non-isolated DC-DC power conversion circuit 100 is non-inverse, meaning that the output voltage has the same polarity as the input voltage. For example, when power is transferred from the primary side to the secondary side of the non-isolated DC-DC power conversion circuit, the voltage at the secondary DC power supply 112 has a polarity that corresponds to the polarity at the primary DC power supply 110.

Figure 2:
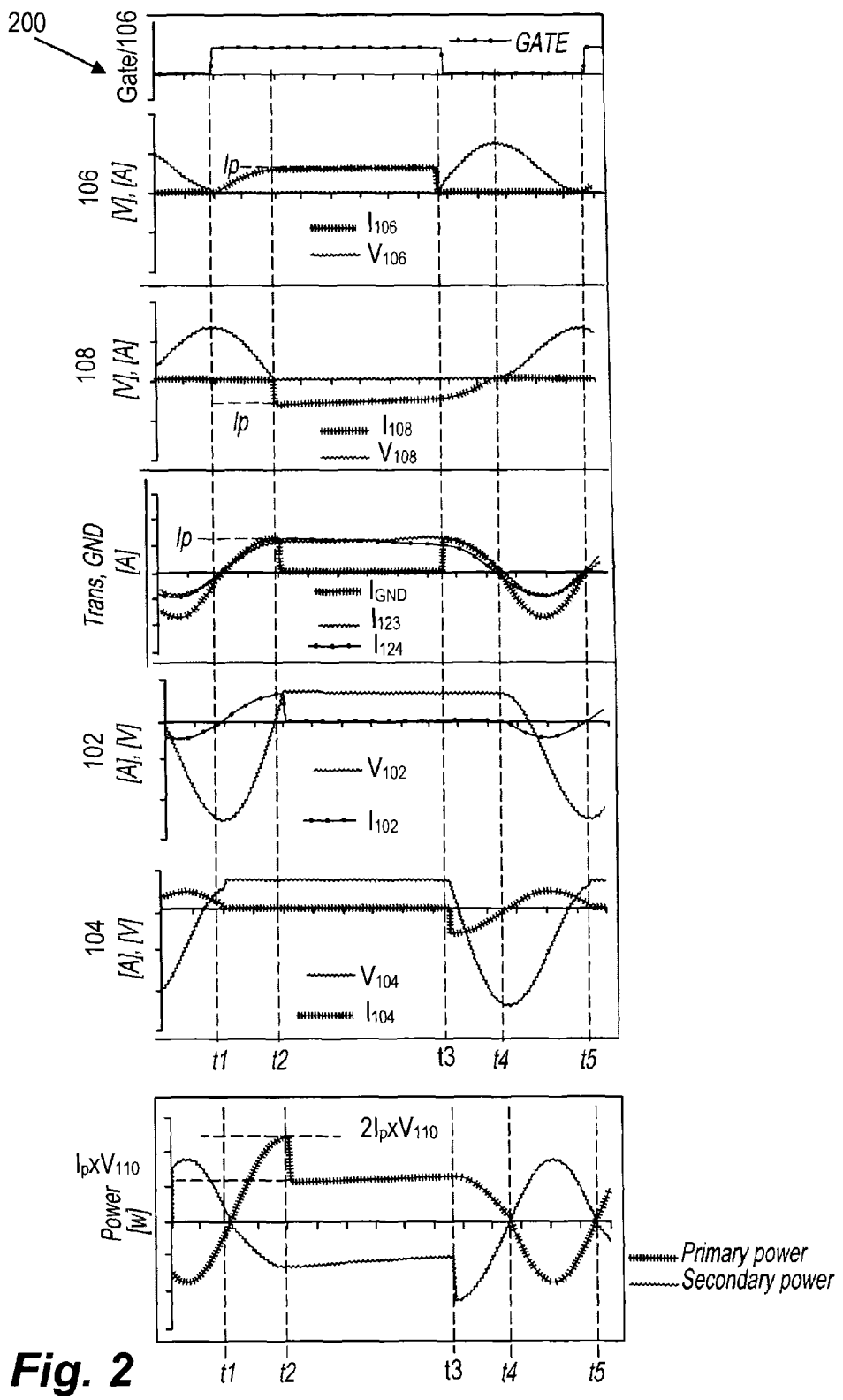
FIG. 2 is an exemplary illustration of current, voltage, and power waveforms of a non-isolated DC-DC power conversion circuit.

FIG. 2 is an exemplary illustration of current, voltage, and power waveforms of the non-isolated DC-DC power conversion circuit 100 with respect to time for one duty cycle of the primary switch 106. For example, graph 200 illustrates a duty cycle for the primary switch 106 that can be turned on at time $t_1$ and subsequently turned off at time $t_3$, according to some implementations. At time $t_5$, another duty cycle can commence. The amount of power transferred from the primary side to the secondary side of the isolated DC-DC power conversion circuit 100 can be modified by changing an amount of on-time of the primary switch 106. For example, to increase the amount of power transferred from the primary side to the secondary side of the isolated DC-DC power conversion circuit 120, the amount of time from time $t_1$ to time $t_3$ is increased. In some implementations, the amount of off-time (time $t_3$ to time $t_5$) for the primary switch 106 is held constant in order to take advantage of soft-switching properties of the non-isolated DC-DC power conversion circuit 100.

In some implementations, bi-directional power transfer can be performed by transferring power from the secondary side to the primary side of the non-isolated DC-DC power conversion circuit 100 by cycling the secondary switch 108 on and off. The description of the transfer of power from the secondary side to the primary side of the non-isolated DC-DC power conversion circuit 100 can also be applied to bi-directional power transfer in a straightforward way to one of ordinary skill in the art.

The duty cycle, switching frequency, and direction of power transfer within the non-isolated DC-DC power conversion circuit 100 can be controlled by one or more electronic control units (ECUs) or similar circuitry. For example, sensors can be installed within battery cells of an electric vehicle (EV) that can sense battery state of charge (SOC), voltage, and the like. In an implementation, the ECUs can process sensor data, display battery SOC information to a user, and send control signals to actuators that align the non-isolated DC-DC power conversion circuit 100. The ECUs can control the direction of power transfer as well as the quantity of power transferred by the non-isolated DC-DC power conversion circuit 100 by controlling the amount of on-time and the switching frequencies of the primary switch 106 and the secondary switch 108. The ECUs can also align the non-isolated DC-DC power conversion circuit 100 to perform functions determined by input from a user.

At time $t_1$, the primary switch 106 can be turned on. In some aspects, the primary switch 106 is turned on when the current through the primary switch $I_{106}$ is zero, which is a type of soft switching that can be referred to as zero current switching (ZCS). In addition, the voltage at the primary switch 106 is also zero at time $t_1$, which is referred to as zero voltage switching (ZVS). In some implementations, switching losses can be reduced when turning on the primary switch 106 by implementing ZCS and/or ZVS. In addition, the primary switch current $I_{106}$ increases in a sinusoidal pattern until a maximum value of $I_P$ is reached at time $t_2$. In an implementation, $I_P$ can be the maximum amount of current on the primary side of the non-isolated DC-DC power conversion circuit 10.

Between times $t_1$ and $t_2$, the capacitor 102 is charged as energy is transferred from the primary side to the secondary side through the secondary leakage inductor 124, and LC resonance occurs. For example, due to the resonance, the capacitor current $I_{102}$ increases in a sinusoidal pattern to an approximate maximum at time $t_2$, and the capacitor current $V102$ increases to reach the voltage of the primary DC power supply 110. The primary leakage inductor current $I_{123}$, the secondary leakage inductor current $I_{124}$, and the ground current $I_{GND}$ across the ground line 116 also increase in a sinusoidal pattern until the maximum value of $I_P$ is reached at time $t_2$. In addition, the capacitor current $I_{104}$ is zero between times $t_1$ and $t_2$. In some aspects, an amount of time between times $t_1$ and $t_2$ is equal to one quarter of a resonant period, and can be referred to as a first resonance period in a duty cycle of the non-isolated DC-DC power conversion circuit 100.

FIG. 3A illustrates current flow paths in a non-isolated DC-DC power conversion circuit 100 between times $t_1$ and $t_2$. Currents $I_{11}$ and $I_{12}$ illustrate current flow paths through the non-isolated DC-DC power conversion circuit 100 between times $t_1$ and $t_2$. Current $I_{11}$ can illustrate current flow on the primary side of the non-isolated DC-DC power conversion circuit 100, and current $I_{12}$ can illustrate how current flows from the primary side to the secondary side of the non-isolated DC-DC power conversion circuit 100 via the cross-connected capacitor 102 and secondary leakage inductor 124 and returns to the primary side via ground line 116. The relationship between current $I_{11}$ and current $I_{12}$ can be defined by the equation, $I_{11}=NI_{12}$, according to some implementations. The resonant frequency, $\omega$, can be defined by the equation, $$\omega = \frac{1}{\sqrt{(L_{123}+L_{124})C_{102/104}}}.$$

$L_{123}$ can be an inductance of primary leakage inductor 123, $L_{124}$ can be an inductance of secondary leakage inductor 124, and $C_{102/104}$ can be a capacitance of capacitor 102 or capacitor 104, according to an implementation.

Between times $t_1$ and $t_2$, the power transferred from the primary side to the secondary side of the non-isolated DC-DC power conversion circuit 100 increases in a sinusoidal pattern until a maximum power of $2I_P \times V_{110}$ is reached at time $t_2$. The power output by the primary side of the non-isolated DC-DC power conversion circuit 100 between times $t_1$ and $t_2$ can be described by the equation, $$P1(t_1<t<t_2) = \frac{1}{T}\int_{t_1}^{t_2} 2I_P \sin(\omega t)\,dt = 2\frac{I_P}{\omega}V_{110}.$$

The power received by the secondary side of the non-isolated DC-DC power conversion circuit 100 can be described by the equation, $$P2(t_1<t<t_2) = \frac{1}{T}\int_{t_1}^{t_2} -I_P \sin(\omega t)\,dt = \frac{-I_P}{\omega}V_{112}.$$

According to certain implementations, a positive value for power transfer represents output power, and a negative value for power transfer represents absorbed or received power, such as when power is transferred from the primary side to the secondary side of the non-isolated DC-DC power conversion circuit 100.

Referring back to FIG. 2, at time $t_2$, which corresponds to ¼ of a resonance period, the capacitor voltage $V102$ is equal to the primary DC power supply voltage $V110$, and the LC resonance ceases. In addition, the secondary switch 108 diode turns on when the sum of the voltages at the leakage inductors 123 and 124 is equal to the sum of the secondary switch 108 diode, which can be explained by the equation, $V_{123}+V_{124}=V_{112}+V_{Diode}$. When the secondary switch 108 diode turns on, capacitor current $I_{102}$ goes to zero, and power is transferred from the primary side to the secondary side of the non-isolated DC-DC power converter circuit 100 through the magnetic core transformer 114.

The power transfer through the magnetic core transformer 114 between times $t_2$ and $t_3$ can be referred to as inductive power transfer or magnetic power transfer, according to an implementation. The primary switch current $I_{106}$ remains constant at $I_P$ between times $t_2$ and $t_3$, and secondary switch current $I_{108}$ remains constant at $-I_P$ between times $t_2$ and $t_3$, which corresponds to the time when inductive power transfer occurs. In addition, the rate of power transfer between the primary side and the secondary side of the non-isolated DC-DC power conversion circuit 100 also remains constant between times $t_2$ and $t_3$ at an approximate value of $I_P \times V_{110}$. In addition, the ground current $I_{GND}$ goes to zero, and the primary leakage inductor current $I_{123}$ and secondary leakage inductor current $I_{124}$ are constant as energy stored at the primary leakage inductor 123 is released to the secondary side of the isolated DC-DC power conversion circuit 100 during the inductive power transfer.

FIG. 3B illustrates current flow paths in a non-isolated DC-DC power conversion circuit 100 between times $t_2$ and $t_3$. $I_{13}$ illustrates how current flows from the primary DC power supply 110 through the magnetic core transformer 114, which causes inductive power transfer to the secondary side of the non-isolated DC-DC power conversion circuit 100, which can be illustrated by current $I_{14}$. The quantity of power, $P_1$, transferred from the primary side to the secondary side of the non-isolated DC-DC power converter circuit 100 between times $t_2$ and $t_3$ can be approximately described by the equation, $$P1(t_2 < t < t_3) = $$
$$-P2(t_2 < t < t_3) = V_{110} \frac{1}{T} \int_{t_2}^{t_3} 2I_P dt = V_{110} I_P \left( \frac{t_3 - t_2}{T} \right) = V_{112} 2I_P \left( \frac{t_3 - t_2}{T} \right).$$

$V_{110}$ is the voltage at the primary DC power supply 110 and $V_{112}$ can be the voltage at the secondary DC power supply 112. In an implementation, control circuitry can control the length of the on-time ($t_3-t_1$) based on the amount of power to be transferred from the primary side to the secondary side of the non-isolated DC-DC power conversion circuit 100. For example, the control circuitry can increase the amount of inductive power transfer from the primary side to the secondary side of the non-isolated DC-DC power conversion circuit 100 by increasing the amount of time between times $t_2$ and $t_3$ of a duty cycle.

Referring back to FIG. 2, at time $t_3$, the primary switch 106 is turned off when the voltage at the primary switch $V_{106}$ and/or primary switch current $I_{106}$ are equal to zero to implement ZVS in order to reduce switching losses. Power can be transferred from the primary side to the secondary side of the non-isolated DC-DC power converter circuit 100 through capacitor 104, leakage inductor 123, and exciting inductor 124. Between times $t_3$ and $t_4$, the non-isolated DC-DC power converter circuit 100 can experience LC resonance at frequency ω that is equal to the resonant frequency between times $t_1$ and $t_2$. In addition, the voltage at the primary switch $V_{106}$ increases in a sinusoidal fashion between times $t_3$ and $t_4$ until a maximum voltage is reached at time $t_4$.

Due to the LC resonance, the leakage inductor currents $I_{123}$ and $I_{124}$ decrease in a sinusoidal pattern until the leakage inductor currents $I_{123}$ and $I_{124}$ go to zero at time t4. In addition, capacitor current $I_{104}$ goes from increases from a negative value to zero between times t3 and t4, and the capacitor voltages $V_{104}$ becomes negatively charged and reaches an approximate minimum at time $t_4$. Current through the secondary switch $I_{108}$ increases in a sinusoidal pattern from a minimum value at time $t_3$ to zero at time $t_4$. In addition, current through the primary switch $I_{106}$ is zero between times t3 and t4, and voltage at the primary switch $V_{106}$ increases in a sinusoidal pattern to an approximate maximum value at time $t_4$.

Figure 3C:
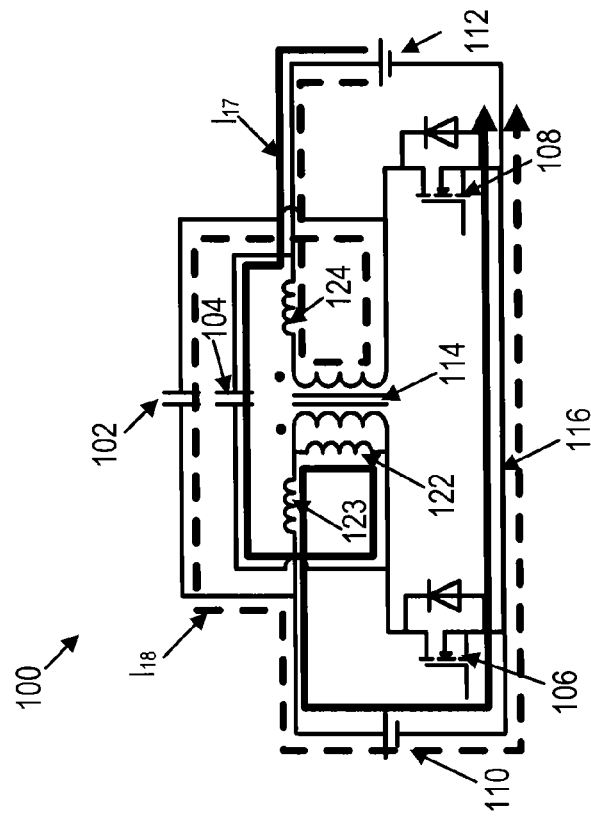
FIG. 3C illustrates an exemplary current flow path in a non-isolated DC-DC power conversion circuit.

FIG. 3C illustrates current flow paths in a non-isolated DC-DC power conversion circuit 100 between times $t_3$ and $t_4$. Currents $I_{15}$ and $I_{16}$ illustrate the current flow path through the non-isolated DC-DC power conversion circuit 100 between times $t_3$ and $t_4$. Current $I_{15}$ can illustrate current flow on the secondary side of the non-isolated DC-DC power conversion circuit 100, and current $I_{16}$ can illustrate how current flows between the primary and secondary sides of the non-isolated DC-DC power conversion circuit 100 through the cross-connected capacitor 104. The current path 116 shows how stored energy in the leakage inductors 123 and 124 is released to the secondary side of the non-isolated DC-DC power conversion circuit 100 via the capacitor 104. The relationship between current $I_{15}$ and current $I_{16}$ can be defined by the equation, $I_{16}=NI_{15}$, according to certain implementations.

The quantity of power, $P_1$, transferred from the primary to the secondary side of the non-isolated DC-DC power converter circuit 100 between times $t_3$ and $t_4$ can be approximately described by the equation, $$P1(t_3 < t < t_4) = \frac{1}{T} \int_{t_3}^{t_4} I_P \sin(\omega t) dt = \frac{I_P}{\omega} V_{110}.$$

The power received by the secondary side of the non-isolated DC-DC power conversion circuit 100, $P_2$, can be described by the equation, $$P2(t_3 < t < t_4) = \frac{1}{T} \int_{t_3}^{t_4} -2I_P \sin(\omega t) dt = \frac{-2I_P}{\omega} V_{112}.$$

Referring back to FIG. 2, between times $t_4$ and $t_5$, capacitors 102 and 104 continue resonance operations to recover energy from the secondary side to the primary side of the non-isolated DC-DC power conversion circuit 100, and at time $t_5$, another duty cycle can commence. For example, the capacitor 102 becomes negatively charged between times $t_4$ and $t_5$, and the capacitor 104 becomes positively charged. In addition, in the period of time between times $t_4$ and t5, the capacitor current $I_{102}$ decrease and then increase in a negative sinusoidal pattern, and the capacitor current $I_{104}$ increases and then decreases in a positive sinusoidal pattern. The leakage inductor currents $I_{123}$ and $I_{124}$ and the ground current $I_{GND}$ also decrease and then increase in a negative sinusoidal pattern.

Figure 3D:
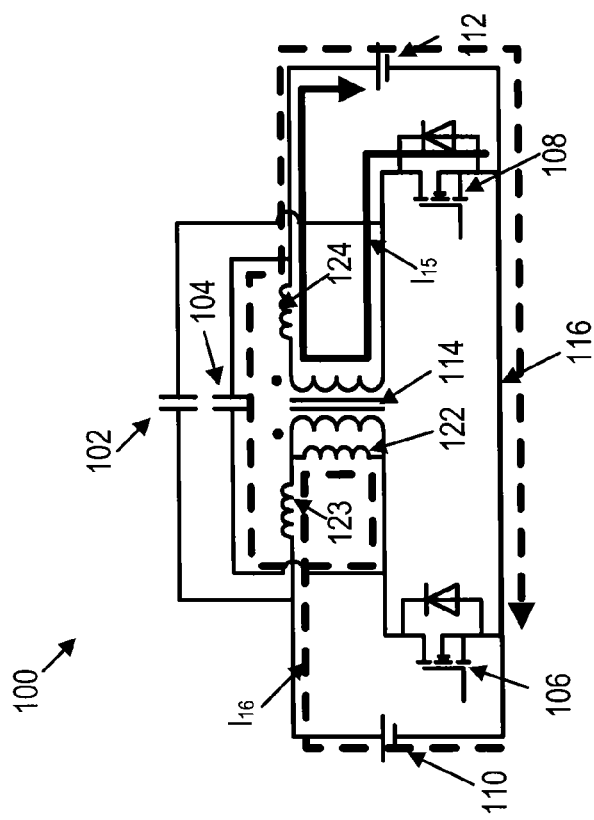
FIG. 3D illustrates an exemplary current flow path in a non-isolated DC-DC power conversion circuit.

FIG. 3D illustrates current flow paths in a non-isolated DC-DC power conversion circuit 100 between times $t_4$ and $t_5$. Currents $I_{17}$ and $I_{18}$ illustrate the current flow path through the non-isolated DC-DC power conversion circuit 100 between times $t_4$ and $t_5$. Current $I_{17}$ can illustrate current flow from the secondary side to the primary side of the non-isolated DC-DC power conversion circuit 100 through the cross-connected capacitor 104. Current $I_{18}$ can illustrate how current flows from the secondary and primary side of the non-isolated DC-DC power conversion circuit 100 via the cross-connected capacitor 102. The power received by the primary side of the non-isolated DC-DC power conversion circuit 100, $P_1$, can be described by the equation, $$P1(t_4 < t < t_5) = \frac{1}{T} \int_{t_4}^{t_5} -I_P \sin(\omega t) dt = -2 \frac{I_P}{\omega} V_{110}.$$

The quantity of power, $P_2$, transferred from the secondary to the primary side of the non-isolated DC-DC power conversion circuit 100 between times t4 and t5 can be described by the equation $$P2(t_4 < t < t_5) = \frac{1}{T} \int_{t_4}^{t_5} I_p \sin(\omega t)\, dt = 2\frac{I_p}{\omega} V_{112}.$$

Referring back to FIG. 2, in some implementations, the total amount of power transferred from the primary side to the secondary side of the non-isolated DC-DC power conversion circuit 100 during one duty cycle of the primary switch 106 from times $t_1$ to $t_5$ can be described by a total power transfer equation, $$P = V_{110} I_p \left( \frac{t_3 - t_2}{T} \right) + \frac{I_p}{\omega} V_{110}.$$

The total power transfer equation is based on the primary DC power supply voltage $V_{110}$ being equal to the secondary DC power supply voltage $V_{112}$ and the turn ratio for the transformer 114 being equal to one. As is shown by the total power transfer equation, the amount of power transferred from the primary side to the secondary side of the non-isolated DC-DC power conversion circuit 100 is based on the length of time from $t_2$ to $t_3$, which corresponds to part of the total on-time of the primary switch 106 from $t_1$ to $t_3$.

At time $t_5$, another of duty cycle of the primary switch 106 can commence. In some implementations, the off-time for the non-isolated DC-DC power conversion circuit 100 from times $t_3$ to $t_5$ is referred to as a second resonance period for the non-isolated DC-DC power conversion circuit 100 and has a length of time that is equal to one half of a resonance period. The control circuitry can maintain a constant off-time in order to take advantage of the ZVS properties when the primary switch 106 is turned off, and the ZVS and ZCS properties when the primary switch 106 is turned on.

Figure 4:
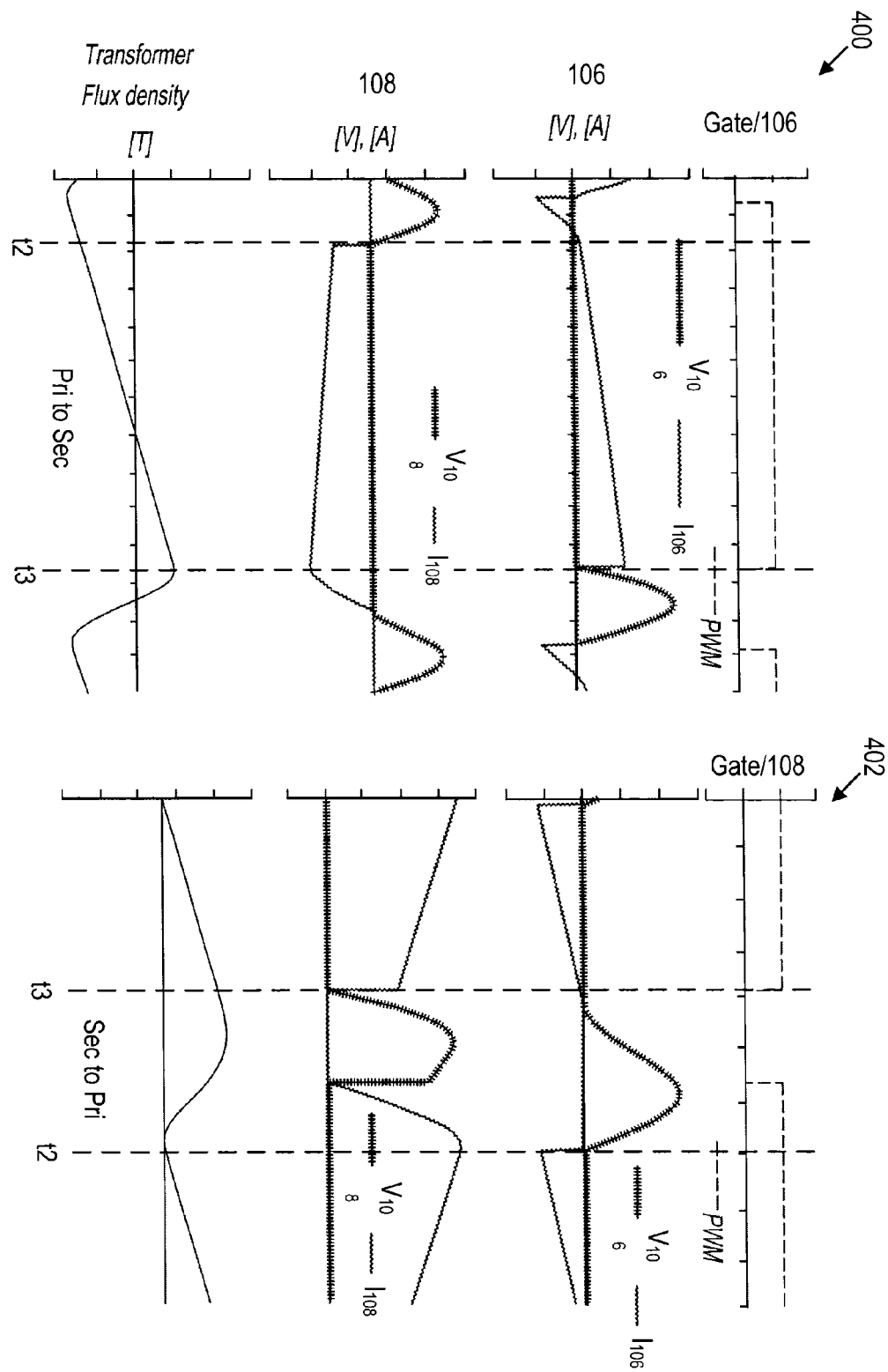
FIG. 4 is an exemplary graph of current, voltage and flux density for a non-isolated DC-DC power conversion circuit.
Figure 5:
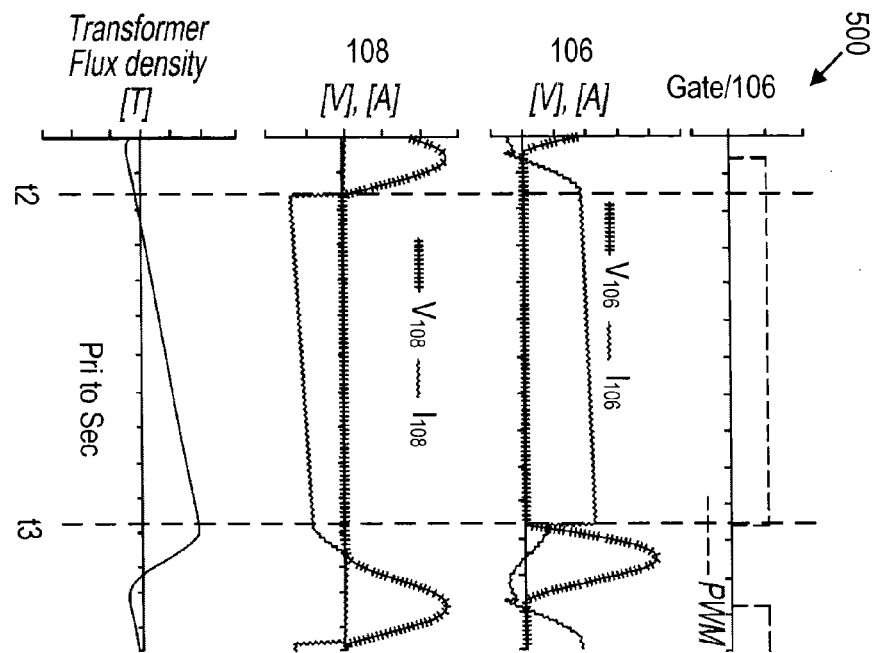
FIG. 5 is an exemplary graph of current, voltage and flux density for a non-isolated DC-DC power conversion circuit.
Figure 5:
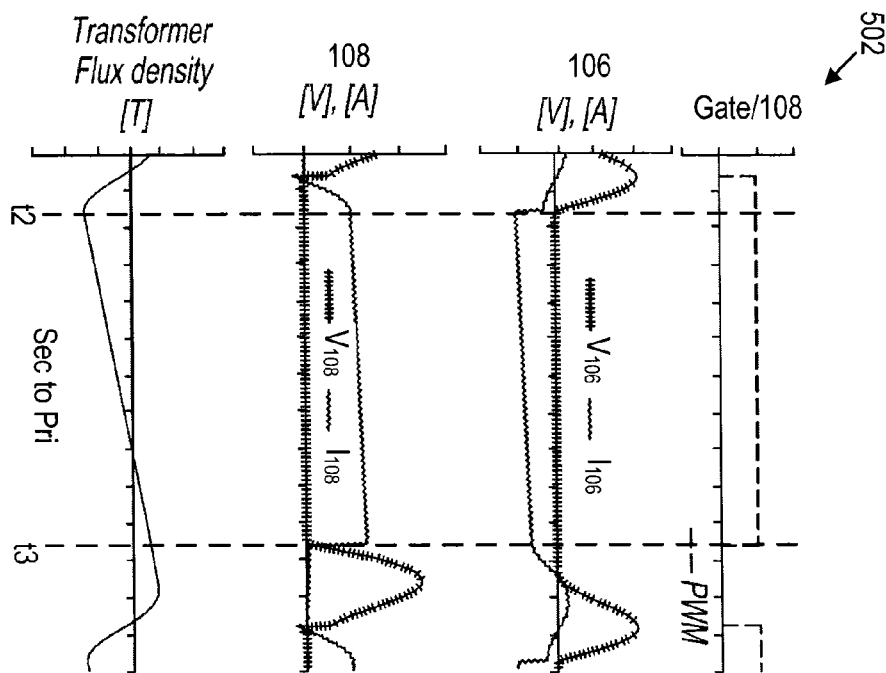

FIG. 4 and FIG. 5 are exemplary graphs of current, voltage and flux density for the non-isolated DC-DC power conversion circuit 100. For the graphs shown in FIG. 4, the voltage of the secondary DC power supply 112 is double the voltage of the primary DC power supply 110, and the turn count N of the transformer 114 is equal to one. The graphs 400 illustrate one implementation where power is transferred from the primary side to the secondary side of the non-isolated DC-DC power conversion circuit 100, and the graphs 402 illustrate an implementation where power is transferred from the secondary side to the primary side of the non-isolated DC-DC power conversion circuit 100. The graphs 400 and 402 show an exemplary duty cycle, voltage and current for the primary switch 106, voltage and current for the secondary switch 108, and flux density of the transformer 114. For simplicity of illustration, only the times t2 and t3 of the duty cycle are shown on the graphs 400 and 402.

In some implementations, the difference in voltage between the primary side and secondary side of the non-isolated DC-DC power conversion circuit 100 increases a flux density within the transformer 114, which can cause stresses on the components of the non-isolated DC-DC power conversion circuit 100. For example, as shown by the graphs in FIG. 2, when the voltages of the primary DC power supply 110 and the secondary DC power supply 112 are equal, the slope of the primary switch current $I_{106}$ and the leakage inductor currents $I_{123}$ and $I_{124}$ is zero between times $t_2$ and $t_3$. The graphs 400 and 402 show that the primary switch current I106 and secondary switch current I108 have a non-zero slope between times t2 and t3, which can result from the increased transformer flux density.

For the graphs shown in FIG. 5, the voltage of the secondary DC power supply 112 is double the voltage of the primary DC power supply 110, and the turn count N of the transformer 114 is equal to two. The graphs 500 illustrate one implementation where power is transferred from the primary side to the secondary side of the non-isolated DC-DC power conversion circuit 100, and the graphs 502 illustrate an implementation where power is transferred from the secondary side to the primary side of the non-isolated DC-DC power conversion circuit 100. The graphs 500 and 502 show an exemplary duty cycle, voltage and current for the primary switch 106, voltage and current for the secondary switch 108, and flux density of the transformer 114. For simplicity of illustration, only the times t2 and t3 of the duty cycle are shown on the graphs 500 and 502.

According to some implementations, increasing the turn count of the transformer 114 to N=2 can reduce an impact of the transformer flux density on the operation of the non-isolated DC-DC power conversion circuit. For example, the change in flux density between times $t_2$ and $t_3$ is reduced, which can also result in a reduced slope of the primary switch current $I_{106}$ and secondary switch current $I_{108}$ between times $t_2$ and $t_3$. In some implementations where the primary DC power supply 110 and secondary DC power supply 112 voltages are unequal, the transformer 114 is designed with a higher turn count to mitigate the effects of the transformer flux density. In other implementations where the power supplies have variable voltages, such as batteries having a voltage range from 12V to 24V, the control circuitry of the ECU can maintain the voltages of the primary DC power supply 110 and secondary DC power supply 112 within a predetermined range of one another in order to reduce the effects of the transformer flux density.

Figure 6:
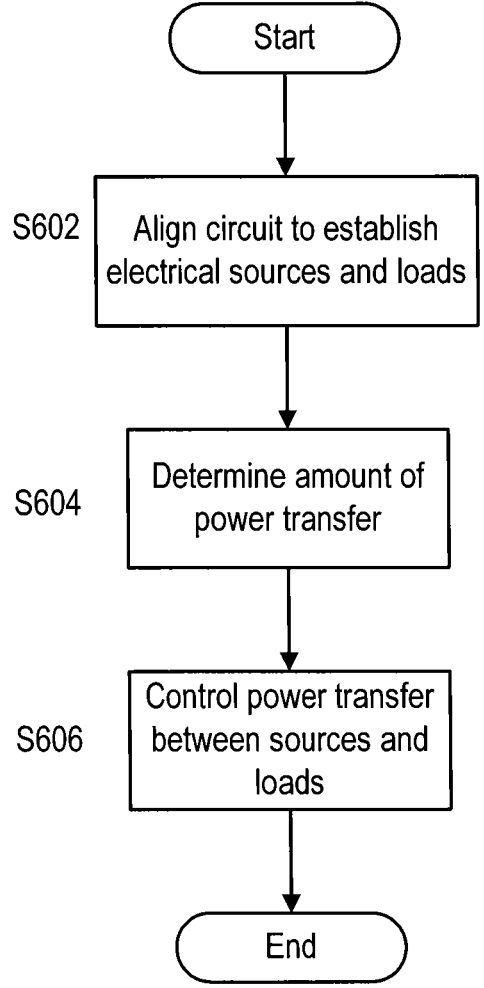
FIG. 6 is an exemplary flowchart of a non-isolated DC-DC power conversion process.

FIG. 6 is an exemplary flowchart of a non-isolated DC-DC power conversion process 600. The non-isolated DC-DC power conversion process 600 can be controlled by one or more ECUs or similar circuitry. Sensors installed within one or more battery cells and other electrical components of an EV power transfer system can sense battery SOC, voltage, current, and the like. The ECUs can process sensor data, display electric power module information to a user, and send control signals to actuators that align the EV power transfer system to maintain continuous power to the electrical components. In some implementations, the actuators send control signals to control the on-time, duty cycle, and switching frequency of the primary switch 106 and secondary switch 108, operating frequency, and direction of power transfer of the non-isolated DC-DC power conversion circuit 100. The ECUs can also align a plurality of isolated and non-isolated DC-DC power conversion circuits to perform power transfer among a one or more sources and/or loads within an EV power transfer system, as will be discussed further herein.

At step S602, control signals are sent to align at least one non-isolated DC-DC power conversion circuit 100 based on a desired direction of power transfer. In some implementations, the electrical components are connected at the primary DC power supply 110 and secondary DC power supply 112 and can function as either power sources or electrical loads. For example, a battery cell in an electrical system of an EV can function as a power source to power electrical components of a vehicle, such as brakes, audio systems, and the like. The battery cell can also function as an electrical load during battery cell balancing among a plurality of battery cells. The control circuitry can send control signals to voltage sensors, current sensors, and timers as well as to the primary switch 106 and the secondary switch 108 to align the non-isolated DC-DC power conversion circuit 100 for the desired direction of power transfer.

At step S604, the control circuitry determines an amount of power to transfer between the primary and secondary sides of the non-isolated DC-DC power conversion circuit 100. As discussed previously, the amount of power transfer can be based on the amount of on-time when inductive power transfer occurs between $t_2$ and $t_3$ during the duty cycle of the primary switch 106 or the secondary switch 108. The control circuitry determines the amount of on-time between times $t_2$ and $t_3$ that corresponds to the amount of power being transferred between the primary and secondary sides of the non-isolated DC-DC power conversion circuit 100. The control circuitry can determine the amount of power to transfer based on load demands of the electric power system, voltage and/or current at the loads connected to the primary DC power supply 110 and the secondary DC power supply 112, and the like.

At step S606, the control circuitry of the ECU controls power transfer between the sources and loads connected to primary and secondary sides of the non-isolated DC-DC power conversion circuit 100. For example, when power is transferred from the primary side to the secondary side of the non-isolated DC-DC power conversion circuit 100, the primary switch 106 is turned on when the current through the primary switch $I_{106}$ is zero to implement ZVS and ZCS in order to reduce switching losses. In addition, when the desired amount of power has been transferred from the primary side to the secondary side of the non-isolated DC-DC power conversion circuit 100, the control circuitry of the ECU issues a control signal to turn off the primary switch 106 at time $t_3$ to implement ZVS. The control circuitry can maintain a constant off-time in order to take advantage of the ZVS properties when the primary switch 106 is turned off, and the ZVS and ZCS properties when the primary switch 106 is turned on. In some aspects, the amount of off time from times $t_3$ to $t_5$ is equal to one half of the resonance period. In some implementations, the total amount of power transferred from the primary side to the secondary side of the non-isolated DC-DC power conversion circuit 100 during one duty cycle of the primary switch 106 from times $t_1$ to $t_5$ can be described by a total power transfer equation, $$P = V_{110}I_p\left(\frac{t_3 - t_2}{T}\right) + \frac{I_p}{\omega}V_{110}.$$

The total power transfer equation is based on the primary DC power supply voltage $V_{110}$ being equal to the secondary DC power supply voltage $V_{112}$ and the turn ratio for the transformer 114 being equal to one.

Figure 7:
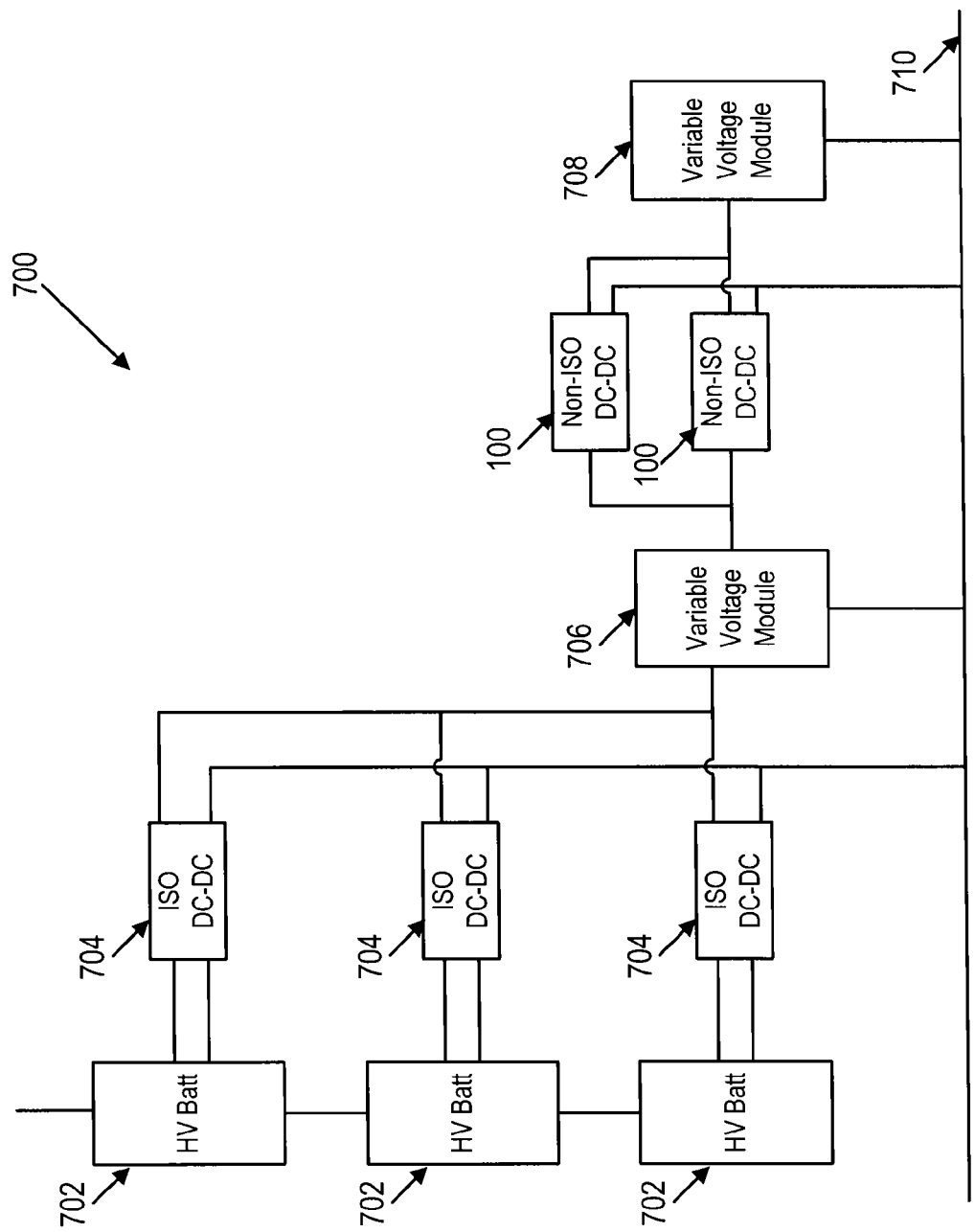
FIG. 7 is an exemplary illustration of a DC electric power system.

FIG. 7 is an exemplary illustration of a DC electric power system 700. In some implementations, the DC electric power system 700 can include one or more power sources that can include battery cells, solar cells, super capacitors, and the like, connected to electrical loads via DC-DC power conversion circuitry. In one implementation, the DC electric power system can include series-connected high voltage (HV) battery cells 702 connected to a first variable voltage module 706 via one or more isolated DC-DC power conversion circuits 704. For example, the first variable voltage module 706 can operate as a power source and/or electrical load and can be a conventional lead (Pb) battery according to one implementation. The first variable voltage module 706 can be connected to a second variable voltage module 708 via parallel-connected non-isolated DC-DC power conversion circuits 100. In other aspects, the DC electric power system 700 has one non-isolated DC-DC power conversion circuit 100 connecting the first variable voltage module 706 and the second variable voltage module 708. The second variable voltage module 708 can include one or more solar cells, super capacitors, or any other type of DC power storage. In addition, the second variable voltage module 708 can also include one or more electrical loads of the EV. The first variable voltage module 706 and the second variable voltage module 708 can also be connected via a common ground line 710.

In some implementations where conventional non-isolated DC-DC power conversion circuits are connected in parallel, voltage interference can exist between the non-isolated DC-DC power conversion circuits, which can make power transfer more difficult to control. For example, a buck-boost power conversion circuit uses voltage-controlled power transfer, and when the buck-boost power conversion circuits are connected in parallel, circulated current between the buck-boost power conversion circuits can increase an amount of error in the voltage sensors, which can impeded the ability of the buck-boost conversion circuits to control the amount of power transferred from power sources to electrical loads. On the other hand, in some implementations, power transfer within the non-isolated DC-DC power conversion circuit 100 is controlled based on on-time of the primary switch 106 and/or the secondary switch 108 which is not affected by the voltage interference. Connecting one or more of the non-isolated DC-DC power conversion circuits 100 in parallel may not affect power transfer control because the power transfer control can be based on on-time of the primary switch 106 or secondary switch 108 rather than voltage.

According to some implementations, the control circuitry of the ECU can be configured to diagnose component failures in the DC electric power system 700. For example, the HV battery cells 702, the variable voltage modules 706 and 708, the isolated DC-DC power conversion circuits 704, and the non-isolated DC-DC power conversion circuits 100 can have installed sensor devices, such as temperature sensors, voltage sensors, current sensors, and other types of sensors that can detect abnormal conditions of the components of the DC electric power system 700. The ECU receives the sensor data from the sensor devices and can determine whether an abnormal condition has occurred. For example, it can be determined that at least one of the parallel-connected non-isolated DC-DC power conversion circuits 100 has failed if the temperature of the non-isolated DC-DC power conversion circuit 100 has increased by a predetermined number of degrees over a period of time. A rising temperature can indicate that the non-isolated DC-DC power conversion circuit 100 is functioning as an isolated DC-DC power conversion circuit and that the soft-switching operations have been corrupted. Likewise, the control circuitry of the ECU can also determine that one of the isolated DC-DC power conversion circuits 702 has failed if the sensor values from one of the sensor devices, such as the temperature or voltage sensor, are outside a predetermined threshold. When a component failure is detected, the control circuitry of the ECU can issue control signals to disconnect the component from the DC electric power system 700 via one or more switches.

Figure 8:
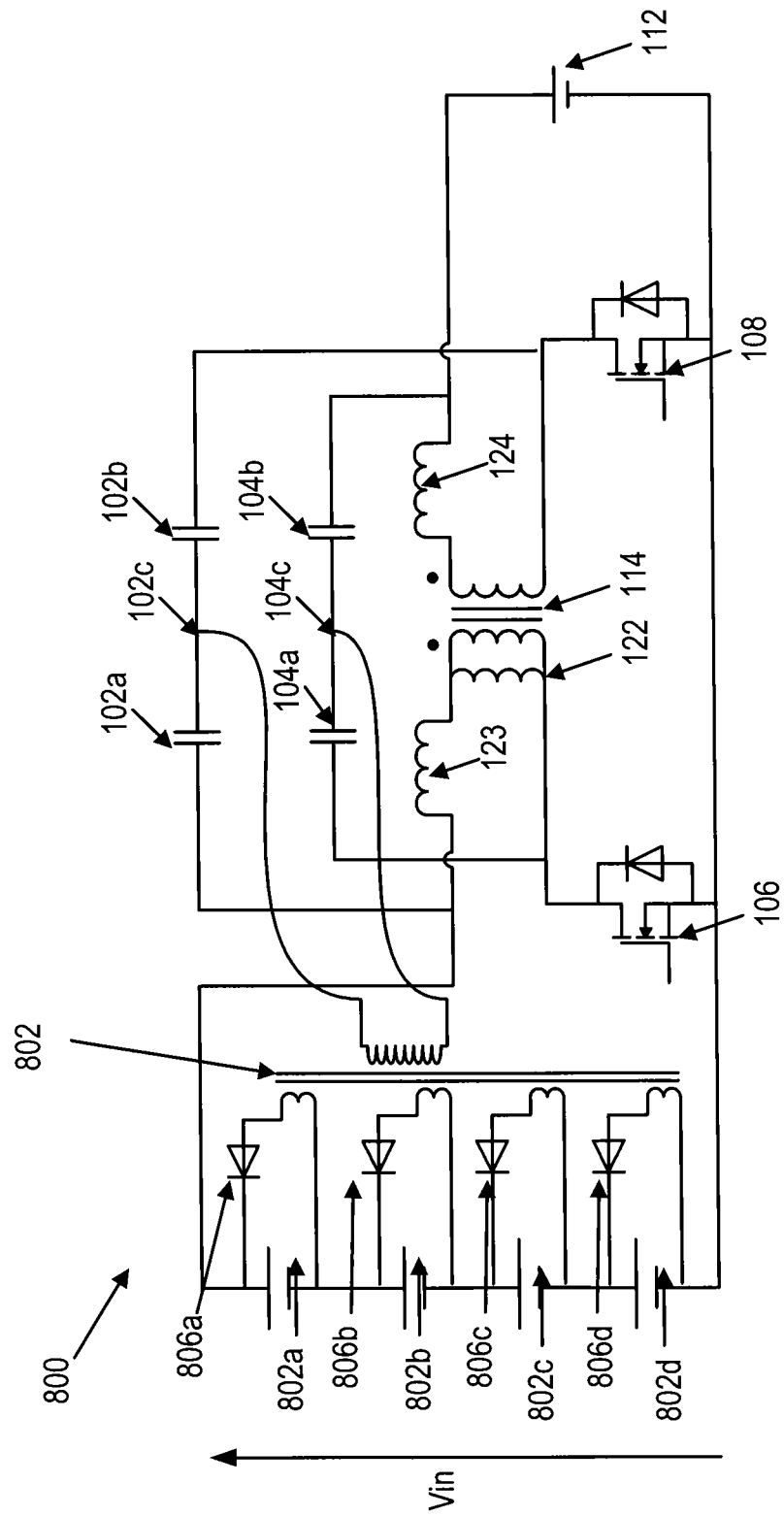
FIG. 8 is an exemplary illustration of a non-isolated DC-DC power conversion circuit with integrated cell balancing circuitry.

FIG. 8 is an exemplary illustration of an integrated DC-DC power conversion and cell balancing circuit 800.

For purposes simplicity of description, the integrated DC-DC power conversion and cell balancing circuit 800 is interchangeably referred to as the DC-DC cell balancing converter 800. The DC-DC cell balancing converter 800 includes cell balancing circuitry connected to the non-isolated DC-DC power conversion circuit 100. The DC-DC cell balancing converter 800 can include a primary side and a secondary side with capacitor pairs 102a/102b and 104a/104b that can be cross-connected across the magnetic core transformer 114. In an implementation, the series capacitance values of the cross-connected capacitors 102a/102b and 104a/104b can be equal. The secondary side can include a secondary switch 108 and a secondary DC power supply 112, and the primary side includes primary switch 106 and battery cells 804a, 804b, and up to 804n, where n represents a total number of battery cells in an energy module that are connected to the DC-DC cell balancing converter 800. In some implementations, the battery cells 804a, 804b, through 804n are included as source cells of an energy module that provides power to loads of an EV.

The balancing circuitry can be connected on the primary side of the DC-DC cell balancing converter 800, according to one implementation. The balancing circuitry can also be connected to the secondary side of the DC-DC cell balancing converter 800. The primary side of the balancing transformer 802 can be connected at point 102c between capacitors 102a and 102b and at point 104c, which is between the capacitors 104a and 104b. In one implementation, the primary side of the balancing transformer 802 can be connected to points 102c and 104c via a switch (not shown). The ECU can issue control signals to close the switch to align the DC-DC cell balancing converter 800 for balanced operations. The secondary side of the balancing transformer 802 has multi-tapped windings such that each tap is connected to the battery cells 804a through 804n via diodes 806a, 806b, through 806n. Throughout the disclosure, references to the balancing circuitry include the components of the DC-DC cell balancing converter 800 associated with cell balancing, such as the balancing transformer 802, diodes 806a, 806b, through 806n that connect the battery cells 804a through 804n to the secondary side of the balancing transformer 802, and other associated electrical connections. In addition, references to DC-DC power conversion circuitry refer to components of the DC-DC cell balancing converter 800 associated with transferring power between the primary side and the secondary side of the DC-DC cell balancing converter 800.

As the primary switch 106 turns on and off during to transfer power from the primary side to the secondary side of the DC-DC cell balancing converter 800, an alternating voltage between points 102c and 104c is produced, which drives the operation of the balancing transformer 802. Because the balancing transformer 802 is driven by the alternating voltage between points 102c and 104c, the DC-DC cell balancing converter 800 does not include a dedicated switch for driving cell balancing operations, according to some implementations. Also, by connecting the primary side of the balancing transformer 802 at points 102c and 104c, the balancing circuitry does not interfere with performance of DC-DC power conversion, according to some implementations.

In order to allow the electrical components to operate as either power sources or electrical loads, the DC-DC cell balancing converter 800 can operate bi-directionally. Like the non-isolated DC-DC power conversion circuit 100, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In some implementations, the primary switch 106 and secondary switch 108 are controlled by gate drivers that are integrated into the primary switch 106 and the secondary switch 108.

As power is transferred from the primary side to the secondary side of the DC-DC cell balancing converter 800, the integrated balancing circuitry ensures that the discharge of energy from the battery cells 804a through 804n is balanced so that the charge and discharge rates of the individual cells are based on maintaining cell voltages that are approximately equal. As power is transferred from the secondary side to the primary side of the DC-DC cell balancing converter 800, such as during cell charging operations, the balancing circuitry allows for balanced charging of the battery cells 804a to 804n.

According to some implementations, the excitation impedance of the balancing transformer 802 is greater than a total excitation impedance of the magnetic core transformer 114 and cross-connected capacitor pairs 102a/102b and 104a/104b. During operations of the DC-DC cell balancing converter 800, balancing operations performed by the balancing circuitry during battery cell charging and/or discharging can occur over a longer time period than DC-DC power transfer between the primary and secondary sides of the DC-DC cell balancing converter 800. For example, balancing of the battery cells 804a to 804n can occur over a period of one or more hours, and can include quantities of energy transfer in an inclusive range of 1 W to 10 W and including 1 Watt (W), 2 W, 5 W, 10 W, or any greater or smaller amount of energy. In one implementation, power transfer between the primary and secondary sides of the DC-DC cell balancing converter 800 involves higher rates of energy transfer where quantities of energy in an inclusive range from 100 W to 1000 W can be transferred from the primary side to the secondary side of the DC-DC cell balancing converter 800 in time periods of less than one hour, such as any time period in the range from less than one minute to less than one hour. The DC-DC cell balancing converter 800 can also implement higher or lower rates of energy transfer for battery balancing and/or DC-DC power transfer than those described herein.

Aspects of the disclosure are directed to a non-isolated DC-DC power conversion circuit 100 that can perform bi-directional power transfer to provide power to one or more electrical loads having a common ground with the a power source. The amount of power transferred between the primary side and secondary side of the non-isolated DC-DC power conversion circuit 100 is based on an amount of on-time of the primary switch 106 or the secondary switch 108. In addition, the non-isolated DC-DC power conversion circuit can be implemented in a DC electric power system, such as in an electric vehicle, where power is transferred between sources and loads having variable voltages.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 9:
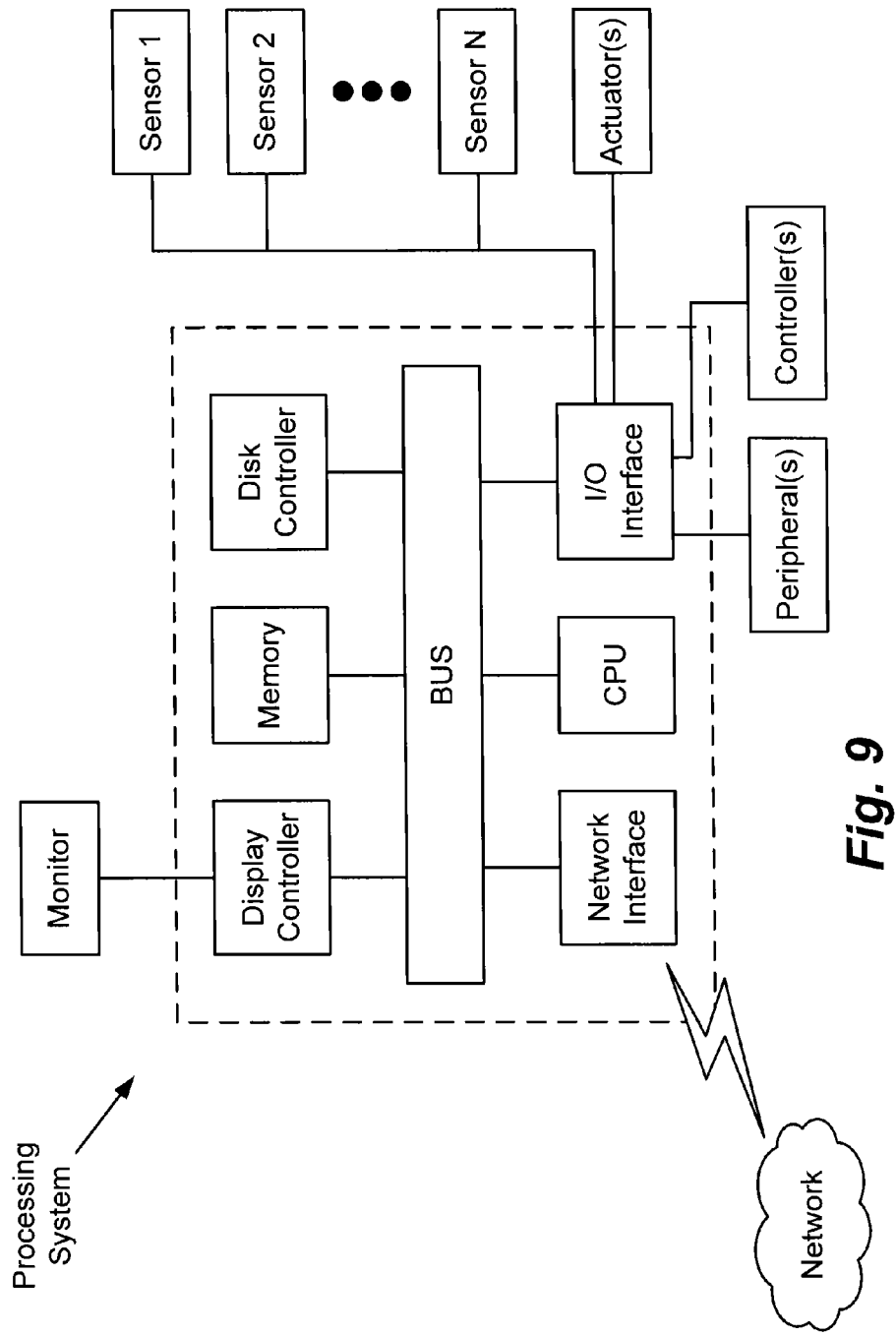
FIG. 9 schematically illustrates a processing system for a processing system, such as a controller and/or a computer system.

FIG. 9 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the modular energy management system. For example, the user can use the controller to select energy modules to provide power to one or more auxiliary electrical loads when the modular energy management system is in standby mode. The I/O interface can also provide an interface for outputting control signals to one or more actuators to control various actuated components, including DC-DC conversion circuitry, balancing circuitry, and other circuitry in the energy modules. In some implementations, the actuators send control signals to align the primary switch 106 to turn on and off at predetermined time intervals to transfer power from the primary side to the secondary side of the non-isolated DC-DC power conversion circuit.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system, comprising:
   non-isolated DC-DC power conversion circuitry including:
      a first switch connected to a second terminal of a first side of a transformer and a second switch connected to a second terminal of a second side of the transformer, the first switch being connected to the second switch via a common ground,
      a first capacitor connected between a first terminal of the first side of the transformer that is not directly connected to a switch and the second terminal of the second side of the transformer, and
      a second capacitor connected between a first terminal of the second side of the transformer that is not directly connected to a switch and the second terminal of the first side of the transformer; and
   control circuitry configured to:
      determine a direction of power transfer through the DC-DC power conversion circuitry,
      align a primary side and a secondary side of the DC-DC power conversion circuitry based on a determined direction of power transfer,
      determine an amount of on-time for the first switch or the second switch based on a quantity of power transfer through the DC-DC power conversion circuitry, and
      control switching of the first switch and the second switch.

2. The system of claim 1, wherein the non-isolated DC-DC power conversion circuitry is configured to perform non-inverse, bi-directional power transfer.

3. The system of claim 1, wherein the control circuitry is further configured to increase the amount of on-time for the first switch or the second switch to increase the quantity of power transferred through the non-isolated DC-DC power conversion circuitry.

4. The system of claim 1, wherein the control circuitry is further configured to maintain a constant off-time for the first switch or the second switch to implement soft-switching.

5. The system of claim 4, wherein the off-time for the first switch or the second switch corresponds to one half of a resonance period.

6. The system of claim 4, wherein the off-time for the first switch or second switch is based on implementing zero voltage switching and zero current switching at turn-on and zero voltage switching at turn-off.

7. The system of claim 4, wherein the non-isolated DC-DC power conversion circuitry is further configured to recover a predetermined amount of power from the secondary side to the primary side during the off-time of the first switch or the second switch.

8. The system of claim 7, wherein the non-isolated DC-DC power conversion circuitry is further configured to recover the predetermined amount of power via one or more leakage inductors, the first capacitor, and the second capacitor.

9. The system of claim 1, wherein the capacitance values of the first capacitor and the second capacitor are equal.

10. The system of claim 1, wherein the non-isolated DC-DC power conversion circuitry has a constant resonant frequency based on inductances of one or more leakage inductors and a capacitance of the first capacitor or the second capacitor.

11. The system of claim 10, wherein the non-isolated DC-DC power conversion circuitry is further configured to transfer power from the primary side to the secondary side via the first leakage inductor, second leakage inductor, and the first capacitor during a first resonance period.

12. The system of claim 11, wherein the first resonance period corresponds to one quarter resonance period commencing when the primary switch or the secondary switch is turned on.

13. The system of claim 1, wherein a turn count of the transformer is based on reducing a flux density within the transformer due to a voltage difference between the first side and the second side of the non-isolated DC-DC power conversion circuitry.

14. The system of claim 13, wherein the control circuitry is further configured to control the voltage difference between the primary side and the secondary side of the non-isolated DC-DC power conversion circuitry based on the flux density within the transformer.

15. The system of claim 1, wherein the control circuitry is further configured to detect component failure within the non-isolated DC-DC power conversion circuitry based on sensor data from one or more sensor devices installed within the non-isolated DC-DC power conversion circuitry.

16. The system of claim 1, wherein the non-isolated DC-DC power conversion circuitry includes integrated cell balancing circuitry including a primary side of a second transformer connected between a first pair and a second pair of cross-connected capacitors of the non-isolated DC-DC power conversion circuitry.

17. The system of claim 1, wherein a total amount of power transferred between the primary side and the secondary side of the non-isolated DC-DC power conversion circuitry is based on an amount of time corresponding to inductive power transfer across the transformer.

18. A method comprising:
determining a direction of power transfer through non-isolated DC-DC power conversion circuitry including a first switch connected to a second terminal of a first side of a transformer and a second switch connected to a second terminal of a second side of the transformer, wherein the first switch is connected to the second switch via a common ground, and wherein a first capacitor is connected between a first terminal of the first side of the transformer that is not directly connected to a switch and the second terminal of the second side of the transformer, and a second capacitor that is connected between a first terminal of the second side of the transformer that is not directly connected to a switch and the second terminal of the first side of the transformer;
aligning a primary side and a secondary side of the non-isolated DC-DC power conversion circuitry based on the determined direction of power transfer;
determining an amount of on-time for the first switch or the second switch based on a quantity of power transfer through the non-isolated DC-DC power conversion circuitry; and
controlling switching of the first switch and the second switch.

19. A system comprising control circuitry configured to:
determine a direction of power transfer through non-isolated DC-DC power conversion circuitry including a first switch connected to a second terminal of a first side of a transformer and a second switch connected to a second terminal of a second side of the transformer, wherein the first switch is connected to the second switch via a common ground, and wherein a first capacitor is connected between a first terminal of the first side of the transformer that is not directly connected to a switch and the second terminal of the second side of the transformer, and a second capacitor that is connected between a first terminal of the second side of the transformer that is not directly connected to a switch and the second terminal of the first side of the transformer;
align a primary side and a secondary side of the non-isolated DC-DC power conversion circuitry based on the determined direction of power transfer;
determine an amount of on-time for the first switch or the second switch based on a quantity of power transfer through the non-isolated DC-DC power conversion circuitry; and
control switching of the first switch and the second switch.

20. The system of claim 1, wherein the first capacitor and the second capacitor are cross-connected across the transformer such that
the first capacitor connects a first power supply on a first side of the DC-DC power conversion circuitry to the second switch on a second side of the DC-DC power conversion circuitry, and
the second capacitor connects a second power supply on a second side of the DC-DC power conversion circuitry to the first switch on the first side of the DC-DC power conversion circuitry.

* * * * *